July 24, 1962　　　P. JACQUINOT ETAL　　　3,045,535
VARIABLE STEP INTERFEROMETERS

Filed Aug. 19, 1959　　　　　　　　　　3 Sheets-Sheet 1

July 24, 1962 P. JACQUINOT ETAL 3,045,535
VARIABLE STEP INTERFEROMETERS
Filed Aug. 19, 1959 3 Sheets-Sheet 3
Fig.5
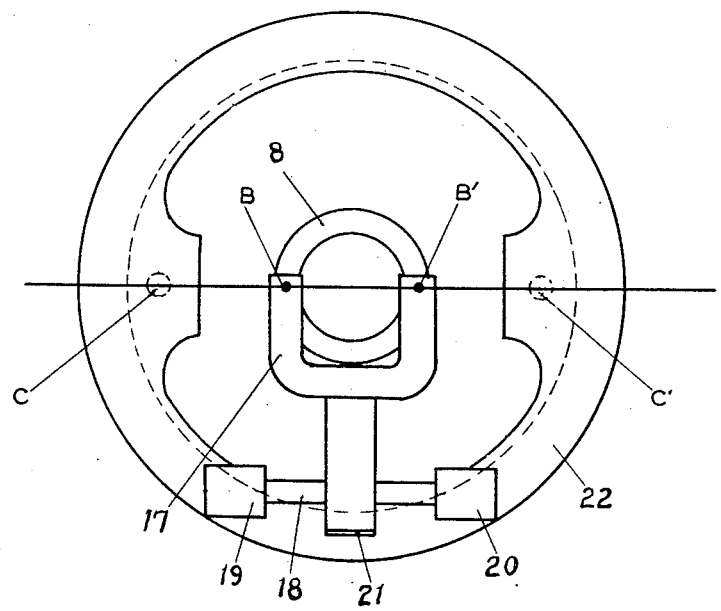
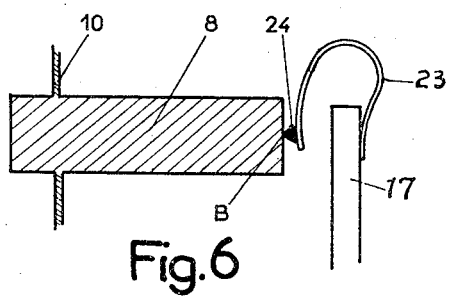
Fig.6

3,045,535
VARIABLE STEP INTERFEROMETERS
Pierre Jacquinot, Bellevue, and Robert Chabbal, Paris, France, assignors to Commissariat a l'Energie Atomique, Paris, France
Filed Aug. 19, 1959, Ser. No. 834,798
Claims priority, application France Aug. 30, 1958
1 Claim. (Cl. 88—14)

This invention relates to variable step interferometers.

Interferometers of the well known Fabry-Perot type comprise essentially two glass plates with planar and parallel faces, which are placed parallel to each other so as to form between them an air sheet. The facing sides of the plates are covered with a partly reflecting, partly transparent layer. Such an assembly constitutes a filter which, in dependence of normal incidence, allows the passage only of rays of wave lengths whose values are well determined in relation with the thickness of the air sheet.

The device supporting the plates must fulfill the following requirements:

Possibility of fine parallel setting of the plates, to about 0.01 micron, which corresponds to 1/50 of a mean wave length of visible light.

Stability in time of the parallelism of the plates, in particular with respect to external disturbances such as vibrations, temperature variations, within tolerances mentioned hereinafter, and stability of the distance between the plates.

Finally, if it is desired to vary the wave length, it must be possible to vary the thickness of the air sheet comprised between the two glass plates.

Most of the conventional devices employ blocks designed to maintain between the plates a given spacing. The blocks are placed either directly between the glass plates, or between the metallic rims which carry the plates and fine parallel setting is effected by suitable crushing of the various blocks, whose thicknesses are, by construction, approximately equal.

Such devices generally do not provide the possibility of varying the distance between the plates.

The present invention relates to an improvement in variable step interferometers of the Fabry-Perot type.

The invention is essentially characterized in that the glass plates with planar and parallel faces are each mounted on two plate-carrying assemblies comprising each two parts. The first part, which is preferably external serves to mount together rigidly the two assemblies, the second, preferably internal, carries the glass plate and is connected to the first part by an elastic member whose deformation is used on one assembly to set the glass plates parallel and on the other assembly to vary the distance between the plates, the latter variation being preferably obtained by means of a reducing system.

Coarse adjustment of the parallelism and of the distance of the two plates may be effected by any known means, such as displacements of the plate-carrying assemblies along threaded bolts, the assemblies being then locked in position by nuts and counter nuts.

The deformable elastic members of the two plate-carrying assemblies are preferably in the form of thin metallic membranes.

Fine parallel adjustment is effected by stresses causing the deformation of the elastic member of the first plate carrying assembly. Thus there are obtained displacements of the second part N of the assembly, said displacements being controlled by any suitable method so as to set the plate of this assembly parallel with the other plate. The stresses may be effected by springs whose deformation is obtained by regulating screws. During such regulation the first part M of the assembly, and all the elements of the other plate carrying assembly are fixed.

To vary the distance between the two plates use is made of the deformation of the elastic member of the second plate-carrying assembly. This deformation causes translation of the part N of said assembly and of the plate associated therewith through the action of a stress applied perpendicularly to the plane of the plates and in such a way that the displacement of the plate be, in effect, a translational displacement. The part M of the assembly on which such regulation is carried out remains fixed, as well as all the elements of the first assembly. In accordance with a preferred, simplified embodiment of the invention, the parts N which support the plates are internal and circular and the parts M by which the two assemblies are mounted are external, circular and concentric with parts N.

To obtain small-amplitude translation of the plate, the stress is effected in a preferred embodiment of the invention by means of a reducing system. Such system may be constituted for example by a yoke, a torsion bar and a flexible rod. The yoke may itself be elastic or may comprise elastic elements which provide further reduction. The yoke is rigidly attached to the torsion bar and, either directly or through the intermediary of its elastic elements, is in contact with the part N supporting the plate. The desired stress is produced by rotation through a small angle of the yoke about the axis of the bar. Rotation is effected by torsion of the bar, which torsion is attained by the application thereto of a torque through the flexible rod whose free end goes through the displacement which is to be reduced.

The displacement which can be given to the movable plate may easily be of the order of one micron, which makes it possible to explore a spectrum covering several successive interference rings.

The fine parallel adjustment of the plates is not destroyed by varying the distance between the two plates.

The advantages obtained by the improvement in accordance with the present invention are:

Precise parallel setting of the two plates;

Variation of the distance between the two plates, which permits exploration of the spectrum; and Maintenance of the parallelism of the plates when the spacing between them is varied.

A non-limiting embodiment of the invention is described hereafter with reference to the accompanying drawing. The particular features described in connection with said embodiment are to be considered as part of the invention, it being understood that any equivalent features may be used within the scope of the invention.

FIGURE 5 is a bottom plan view of the general support for the device.

FIGURE 6 is a schematical fragmentary, partly sectional view of a modified embodiment of the means for applying stress of the yoke.

The drawings show only the elements which are necessary to an understanding of the invention, and corresponding elements in the several figures are indicated by the same reference characters.

Figures 1, 3:
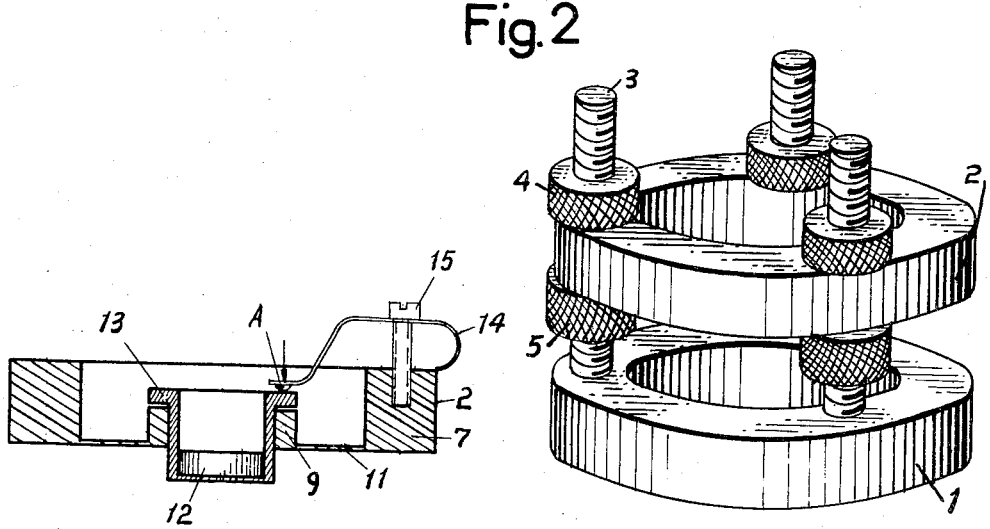
FIGURE 1 is a perspective view of the two plate-carrying assemblies.
FIGURE 3 is an axial section showing in detail the assembly on which is effected the parallel setting.

FIGURE 1 shows the plate-carrying assemblies 1 and 2 which are mounted together by means of three bolts 3 rigidly secured to the assembly 1, and perpendicular thereto; the bases of the bolts define an equilateral triangle. The plate-carrying assembly 2 is secured to the bolts by means of nuts 4 and counter-nuts 5 which make it possible to set the assembly 2 at the desired distance from the assembly 1 and to effect coarse parallel setting of the two assemblies.

Figure 2:
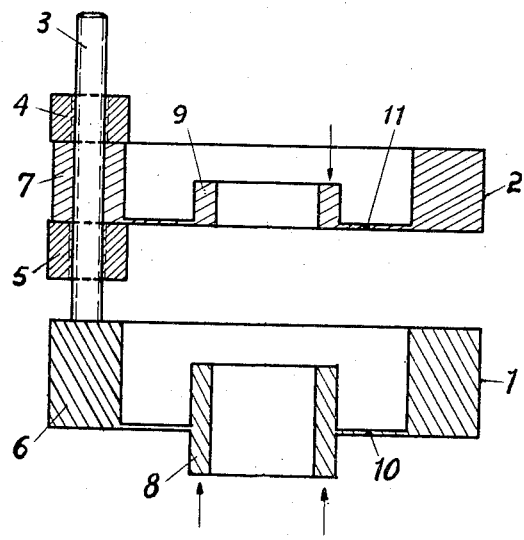
FIGURE 2 is an axial section of the two plate-carrying assemblies.

As shown in FIGURE 2, each of the assemblies 1 and 2 is constituted by a rigid external ring, respectively 6 and 7, and by an equally rigid internal ring, respectively 8 and 9. Between the external and the internal ring there is a thin portion, respectively 10 and 11, which constitutes an elastic deformable membrane.

FIGURE 3 shows the device effecting parallel setting of the plates. The mounting of the glass plate 12 of assembly 2 consists of the interior ring 9 and a steel tube 13 inserted in the ring. To obtain parallelism of the two plates, three stresses are applied to the tube 13 at three points thereof such as point A, disposed at the apexes of an equilateral triangle, the stresses being obtained by means of three springs 14 secured to the external ring 7 and deformed by three adjustment screws 15.

Figure 4:
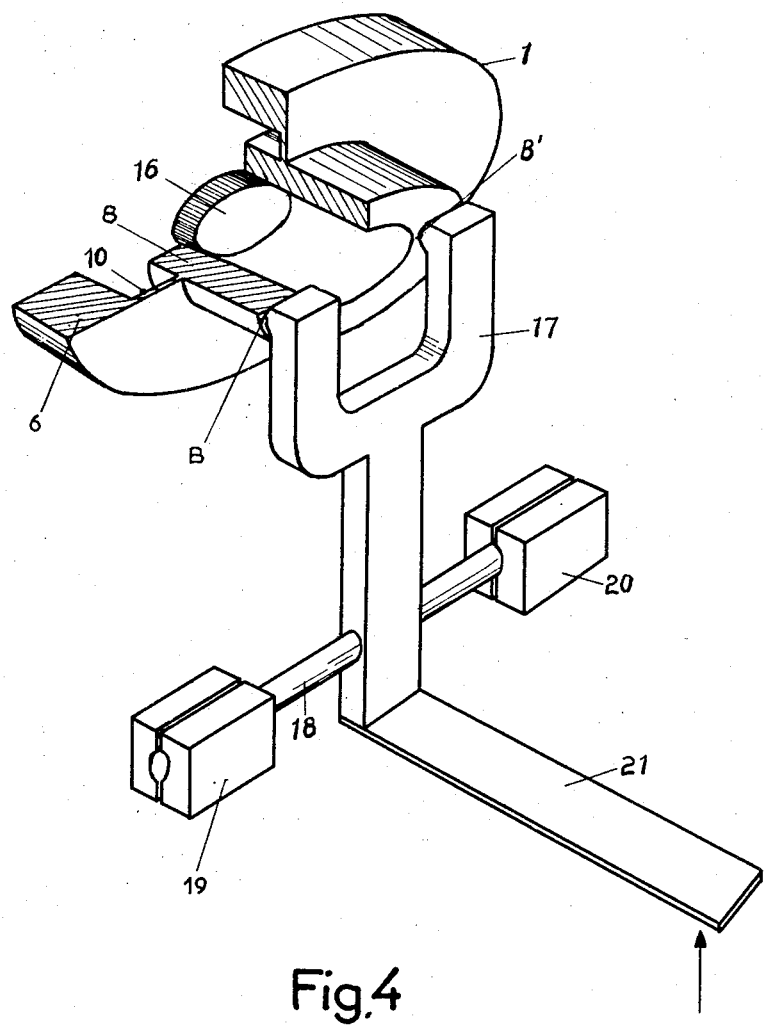
FIGURE 4 is a perspective view of the assembly on which is effected the adjustment of the distance between the plates.

FIGURE 4 illustrates the device for effecting translation of the internal ring 8 which mounts the glass plate 16, which is the movable plate. Forces perpendicular to the plane of the assembly 1 are exerted at two diametrically opposite zones B and B' of the ring by a yoke 17 which rotates through a small angle about an axis parallel to the plane of assembly 1. Under the action of these forces the ring 8 undergoes a movement of translation due to deformation of the membrane 10.

The yoke 17 is rigidly secured to a cylindrical bar 18, rigidly held at its ends in vises 19 and 20, and which acts as a torsion bar. Torsion of the bar 18 effects rotation of the yoke 17 about an axis of rotation which coincides with the axis of the bar. Torsion is obtained by the action of a torque applied to the bar through a flexible metallic rod or blade 21 whose free end is displaced under the action of a cam or of an adjustment screw not shown in FIGURE 4. The displacement of the end of the rod 21 is transmitted, reduced, on the ring 8. It is thus possible to displace the plate 16 by a few microns, which makes it possible to explore a spectrum covering several successive interference rings of the interferometer.

In FIGURE 5 there is shown the general support of the device which consists of a plate 22 on which is mounted the assembly 1 at two diametrically opposed points C and C' situated in a plane perpendicular to the assembly 1 and passing through the zones B and B' at which the yoke 17 exerts a stress on the ring 8. In this manner the reactions at C and C' to stress of the yoke do not create any dissymmetry, thereby ensuring that the movement of plate 16 is a true movement of translation. The outer periphery of ring 6 is shown in dotted lines.

The sectional plane of FIGURE 6 is the median plane of one of the arms of the yoke 17, perpendicular to the torsion bar 18. The FIGURE shows a blade 23 which constitutes the elastic element of one of the arms of yoke 17 and which engages through stud 24 the zone B of ring 8. The other arm of the yoke comprises an identical elastic element; the modified manner of applying the stress of the yoke, illustrated in FIGURE 6, provides further reduction and improves the stability of the device.

The depth of tube 13 may be calculated in such a way as to compensate between the expansions of the bolts on the one hand and the sum of the expansions of the tube 13 and of plate 16 on the other hand. Such compensation is only strictly valid for a given thickness of the air sheet between the two glass plates, but it is sufficient within a certain range of thicknesses of the air sheet.

Substitution of tubes of different depths enables to effect such compensation for different ranges of thickness of the air sheet.

The embodiments of the invention in which an exclusive property or privilege is claimed are defined as follows:

In a variable interferometer of the Fabry-Perot type having first and second glass plates with spaced opposed planar and parallel faces, a plate carrying assembly for each of said plates, a first part for each of said assemblies, a second part for each of said assemblies carrying its respective plate, an elastic member for each of said assemblies connecting the corresponding first and second parts thereof, means for adjustably spacing said assemblies and said plates extending between said first parts, means on one of said assemblies for deforming the corresponding elastic member and for positioning the corresponding first plate parallel to the second plate, means on said other assembly for deforming the corresponding elastic member and for moving the corresponding second plate with respect to the first plate while parallel therewith comprising a sensitive motion transmitting device acting on said second part including a torsion bar parallel to the adjacent second plate, clamp means securing the ends of said bar, a yoke secured to said bar and rotatable about the axis of said bar, a flexible rod connected to said torsion bar, means for displacing the end of said rod away from said torsion bar and resilient elements between said yoke and the adjacent second part.

References Cited in the file of this patent

"A Mount for a Perrot-Fabry Interferometer Without Etalon Ring," Haber, Journal of the Optical Society of America, vol. 39, No. 12, pages 1050, 1051, December 1949.